(No Model.)
D. B. MERRELL & J. G. RIPPEY.
THILL COUPLING.
No. 430,782. Patented June 24, 1890.
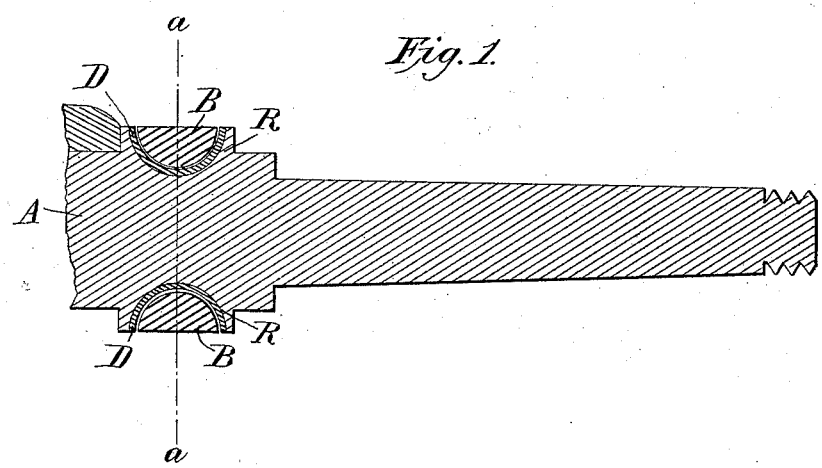
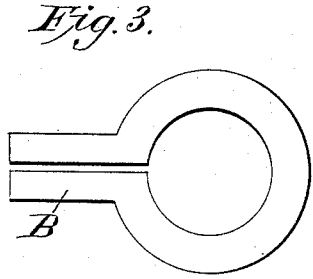
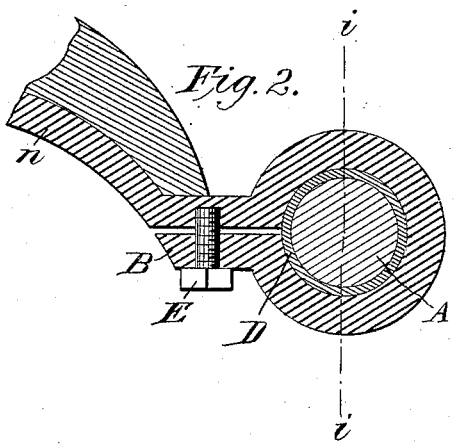
Witnesses:
Chas. F. Adams
George Adams
Inventors:
Daniel B Merrell
J. G. Rippey
per D. B. Merrell Attorney

UNITED STATES PATENT OFFICE.

DANIEL B. MERRELL AND JAMES GROVE RIPPEY, OF GENEVA, NEW YORK; SAID RIPPEY ASSIGNOR TO SAID MERRELL.

THILL-COUPLING.

SPECIFICATION forming part of Letters Patent No. 430,782, dated June 24, 1890.

Application filed January 10, 1887. Serial No. 223,933. (No model.)

*To all whom it may concern:*

Be it known that we, DANIEL B. MERRELL and JAMES GROVE RIPPEY, citizens of the United States, residing at Geneva, Ontario county, State of New York, have invented certain new and useful Improvements in Thill-Couplings, of which the following is a specification.

Our invention relates to a thill-coupling in which a strap or band of metal encircles the iron axle of the vehicle and is connected with the thills or pole by being welded or bolted to the thill or pole irons.

The object of our invention is, first, to provide a thill-coupling that will not rattle, and, second, to provide a coupling that may be cheaply made and readily attached to a vehicle-axle. We attain these objects by the mechanism illustrated in the accompanying drawings, in which—

Figure 1 is a vertical section of the axle and coupling on the line *i i*, Fig. 2. Fig. 2 is a sectional view of axle-coupling and thill on the line *a a*, Fig. 1. Fig. 3 is a side view of the strap forming part of the coupling.

Similar letters refer to similar parts throughout the several views.

The strap B, encircling the axle A within groove R, is in the present instance welded to thill-iron N and held in place by set-screw E. The axle A has a groove R cut entirely around it to receive strap B and packing D within said groove R, and to support the strap B and prevent rattling. The strap B may be attached to the thill by passing a bolt through the strap B and thill-iron N near the ends of the strap and thill-irons. To detach the thills or pole from the vehicle-axle, we loosen the set-screw E and open the strap B far enough to allow the strap to be removed from the axle. The strap B is set around the axle A sufficiently tight to prevent rattling, but loose enough to allow the hinge movement of strap B around axle A.

We are aware that previous to our invention thill-couplings have been made in which a strap in two parts and supported by a bearing provided for the purpose encircles both the wood and iron of axle; also, couplings made in semicircular form and held in place by a collar and the hub and box of a wheel. We therefore do not claim such a combination, broadly; but What we do claim as our invention, and desire to secure by Letters Patent, is—

The combination, with a vehicle-axle having a concave bearing-groove, of a thill-strap surrounding the axle and having a convex surface to fit the concave groove and an interposed packing, substantially as described.

DANIEL B. MERRELL.
J. GROVE RIPPEY.

Witnesses:
EDWARD G. DORCHESTER,
FRED G. NARES.